United States Patent
Ono

(10) Patent No.: US 6,168,230 B1
(45) Date of Patent: Jan. 2, 2001

(54) DEFROSTER DUCT INSTALLATION STRUCTURE

(75) Inventor: Masahiro Ono, Okazaki (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/385,096

(22) Filed: Aug. 30, 1999

(30) Foreign Application Priority Data

Sep. 24, 1998 (JP) .................................. 10-269592

(51) Int. Cl.$^7$ .............................. B60H 1/26; B60H 1/28; B60H 1/34
(52) U.S. Cl. ........................ 296/208; 296/70; 296/192
(58) Field of Search .................... 296/208, 70, 192; 454/121, 127, 146, 147, 148

(56) References Cited

U.S. PATENT DOCUMENTS

| 4,646,879 | * | 3/1987 | Mahler et al. ..................... 296/208 |
| 4,907,497 |   | 3/1990 | Danieau ................................ 98/2.08 |
| 4,909,566 |   | 3/1990 | Hashimoto et al. ................. 296/192 |
| 5,354,114 | * | 10/1994 | Kelman et al. ..................... 296/192 |
| 5,487,800 | * | 1/1996 | Ash ........................................ 296/70 |
| 5,556,153 | * | 9/1996 | Kelman et al. ....................... 296/70 |
| 5,564,515 |   | 10/1996 | Schambre .............................. 180/90 |
| 5,762,395 |   | 6/1998 | Merrifield et al. .................... 296/203 |
| 5,938,266 | * | 8/1999 | Dauvergne et al. .................... 296/70 |
| 5,979,965 | * | 4/1999 | Nishijima et al. ...................... 296/70 |
| 6,045,444 | * | 4/2000 | Zima et al. ........................... 454/121 |
| 6,089,642 | * | 7/2000 | Davis, Jr. et al. .................... 2196/70 |

FOREIGN PATENT DOCUMENTS

| 374975 | 6/1990 | (EP) . |
| 60-145935 | 9/1985 | (JP) . |
| 1-156182 | 6/1989 | (JP) . |
| 1-178089 | 7/1989 | (JP) . |
| 09042251 | * 2/1997 | (JP) . |
| 10-175430 | 6/1998 | (JP) . |

* cited by examiner

Primary Examiner—D. Glenn Dayoan
Assistant Examiner—Greg Blankenship
(74) Attorney, Agent, or Firm—Pillsbury Madison & Sutro LLP

(57) ABSTRACT

An engagement portion to be engaged with a vehicle body is formed on the lower surface of the front end of a joined portion of a defroster duct. The engagement portion is engaged with a fitting hole of a cowl panel. The joined portion of the defroster duct has a curve portion formed thereon, in which a rib of an instrument panel abuts against a duct portion of the defroster duct. When the duct portion is pressed forward of the vehicle, the curve portion elastically deforms so as to keep a blow port of the defroster duct aligned with a blow port of the instrument panel.

11 Claims, 4 Drawing Sheets

DEFROSTER DUCT INSTALLATION STRUCTURE

The disclosure of Japanese Patent Application No. HEI 10-269592 filed on Sep. 24, 1998 including the specification, drawings and abstract is incorporated herein by reference in its entirety.

BACKGROUND OF THE INVENTION

1. Field of the Invention

The present invention relates to a defroster duct installation structure, and more particularly, to the installation structure used for installing the defroster duct in a vehicle body such as an automobile, on which an instrument panel is covered.

2. Description of the Related Art

Conventionally, a structure for installing the defroster duct into a vehicle body such as an automobile has been disclosed, for example, in Publication of Japanese Patent Application HEI 10-175430.

Referring to FIG. 4, in a conventional defroster duct installation structure, a defroster duct 100 is divided into two portions, a lower defroster portion 102 and an upper defroster portion (defroster nozzle) 104. The lower defroster portion 102 is fitted to a blow port 106 of an air conditioning unit mounted on the vehicle body side.

In the state where the defroster duct 100 is divided into two portions: the lower defroster portion 102 and the upper defroster portion 104, the lower defroster portion 102 is fitted to the blow port 106 of the air conditioning unit and the defroster upper 104 is fitted to the instrument panel 108 so as to be installed to the vehicle body. This makes it possible to fit blow ports 104A of the defroster upper 104 to the corresponding blow ports 108A formed in the instrument panel 108 without any relative displacement. As a result, this structure prevents the blow port 108A of the instrument panel 108 from deteriorating its air supply performance (defroster performance). The lower defroster portion 102 and the upper defroster portion 104 are joined together while installing the instrument panel 108 to the vehicle body.

The aforementioned defroster duct installation structure eliminates the relative displacement between the blow port 108A of the instrument panel 108 for covering the upper defroster portion 104 and the blow port 104A thereof. However, such structure requires the integration of the upper defroster portion 104 with the instrument panel 108 before it is installed to the vehicle body. The resultant integrated instrument panel is increased in size, and the installation capability, thus, is deteriorated.

SUMMARY OF THE INVENTION

An object of the present invention is to provide a defroster duct installation structure which eliminates the relative displacement between blow ports of the instrument panel and the defroster duct as well as improves the installation capability.

According to a first aspect of the present invention, a defroster duct installation structure is defined by a defroster duct including an engagement portion to be engaged with a vehicle body and a duct portion that leads the flow of air conditioned by an air conditioning unit to the interior of a vehicle, an instrument panel that covers the defroster duct, a positioning portion formed in the instrument panel abutted against a duct portion of the defroster duct so as to align a blow port of the defroster duct with a blow port of the instrument panel, and displacement means for allowing displacement of the duct portion relative to the engagement portion.

In the aforementioned aspect, the displacement means formed on the defroster duct includes a deforming portion that deforms when the positioning portion presses the duct portion of the defroster duct. The deforming portion elastically deforms when the positioning portion presses the duct portion of the defroster duct.

After engaging the engagement portion of the defroster duct with the vehicle body during installation, the positioning portion formed on the instrument panel is brought into abutment against the duct portion of the defroster duct. Then, the blow port of the defroster duct is aligned with the blow port of the instrument panel. After bringing the positioning portion formed on the instrument panel into abutment against the duct portion of the defroster duct, when the instrument panel is further shifted toward the fixed direction, the positioning portion formed on the instrument panel presses the duct portion of the defroster duct toward the fixed direction. In the above state, the engagement portion of the defroster duct is engaged with the vehicle body. The displacement means deforms to displace the duct portion relative to the engagement portion. Therefore, the blow port of the defroster duct is kept aligned with the blow port of the instrument panel, eliminating the relative displacement therebetween. Unlike the generally employed art, in the present invention, the defroster duct does not have to be preliminarily integrated with the instrument panel. Accordingly, the size of the instrument panel is not increased, and the installation capability, thus, can be improved.

In the aforementioned aspect, it is preferable to dispose the displacement means between the engagement portion and the duct portion.

In the defroster duct installation structure of the first aspect of the invention in view of the second aspect thereof, the displacement means is disposed in the duct portion opposite to the portion that abuts against the positioning portion, and deformed in substantially the same direction as the one for installing the instrument panel.

When the duct portion of the defroster duct is pressed by the positioning portion in the direction where the instrument panel is installed, the displacement means deforms in the direction to which the pressure is applied. Then, accompanied with shifting of the instrument panel, the duct portion shifts toward the direction where the instrument panel is installed. The blow port of the defroster duct can be aligned with the blow port of the instrument panel only by installing the instrument panel. In the aforementioned state, the instrument panel is fixed to the vehicle body, and a reaction force caused by the deformation of the displacement means acts upon the abutted portion between the instrument panel and the defroster duct. As a result, the fit of the abutted portion between the instrument panel and the defroster duct can be made tighter.

According to the aforementioned second aspect, the instrument panel is installed to the duct portion at a location substantially rear of the vehicle, which allows the displacement means to change the position of the duct portion along the longitudinal direction of the vehicle body relative to the engagement portion of the defroster duct.

In accordance with the aforementioned second aspect of the present invention, the instrument panel is installed to the duct portion at a substantially top portion of the vehicle, which allows the displacement means to change the position of the duct portion along the vertical direction of the vehicle relative to the engagement portion of the defroster duct.

According to the first and the second aspects of the present invention, the positioning portion may be a rib formed at the lower surface of the instrument panel. Further, the rib can have its profile formed into a triangle.

In the first and the second aspects of the present invention, the positioning portion can be formed into a protruded portion on the lower surface of the instrument panel.

In the first and the second aspects of the present invention, the displacement means includes a U-like shaped or bellows-like shaped curve portion disposed between the engagement portion and the duct portion.

DETAILED DESCRIPTION OF THE PREFERRED EMBODIMENTS

Figure 1:
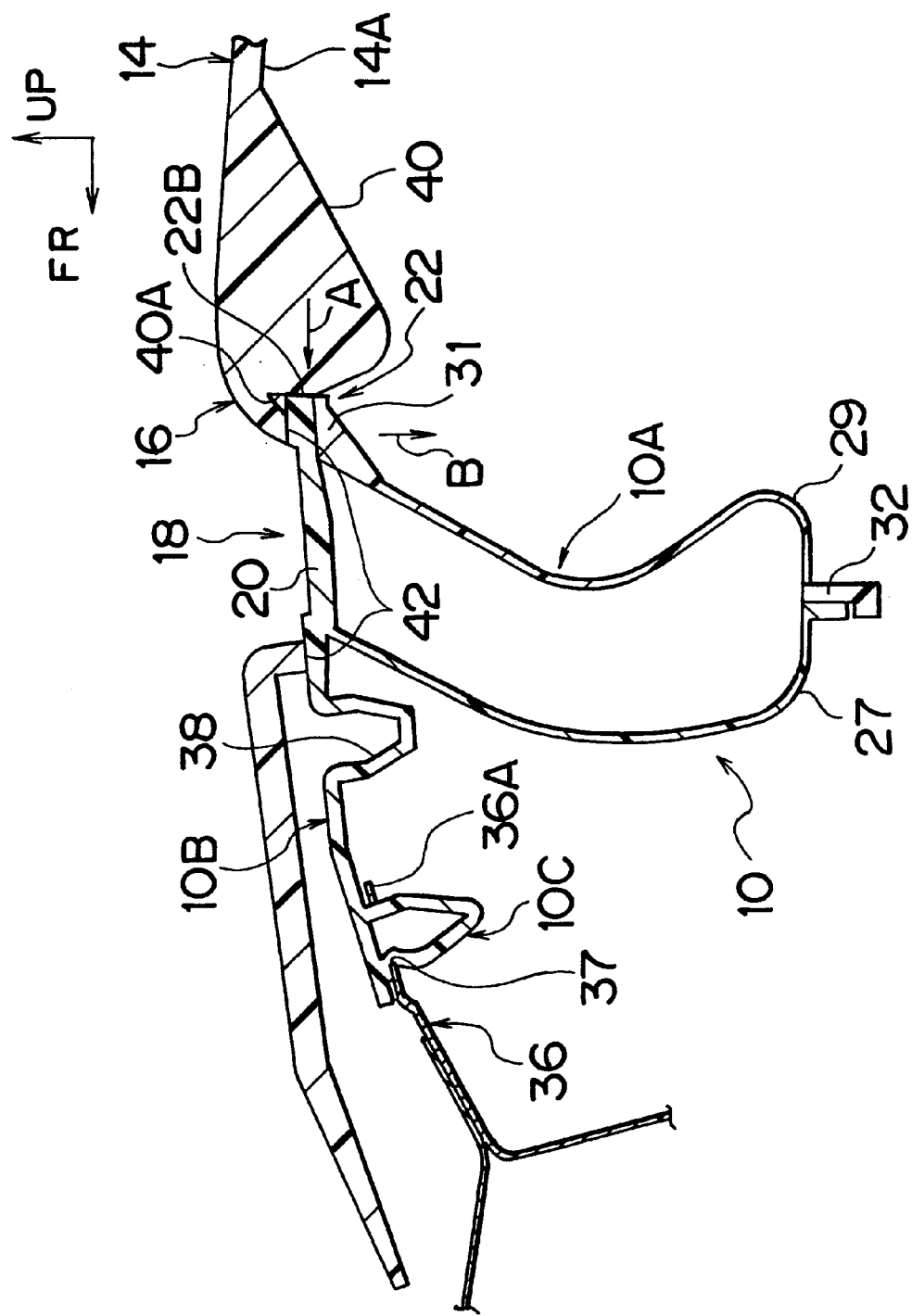
FIG. 1 is an enlarged sectional view taken along the line I—I of FIG. 3.

One embodiment of a defroster duct installation structure will be described referring to FIGS. 1 to 3. The term UP shown in the drawings indicates the upward direction of the vehicle, and FR indicates the forward direction of the vehicle.

Figure 3:
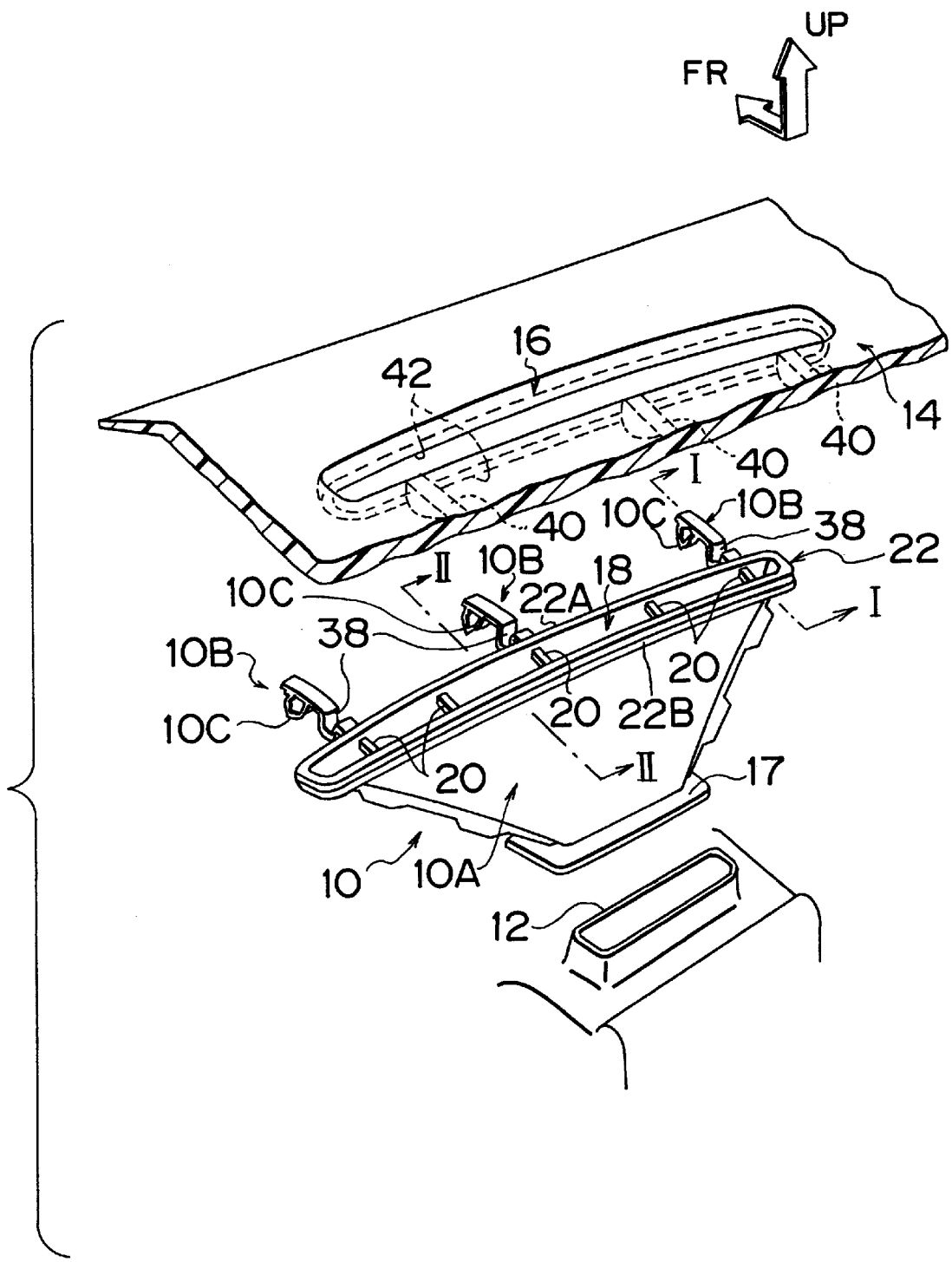
FIG. 3 is an exploded perspective view of a defroster duct installation structure of an embodiment of the present invention seen in the inclined direction from the rear of the vehicle.
Figure 4:
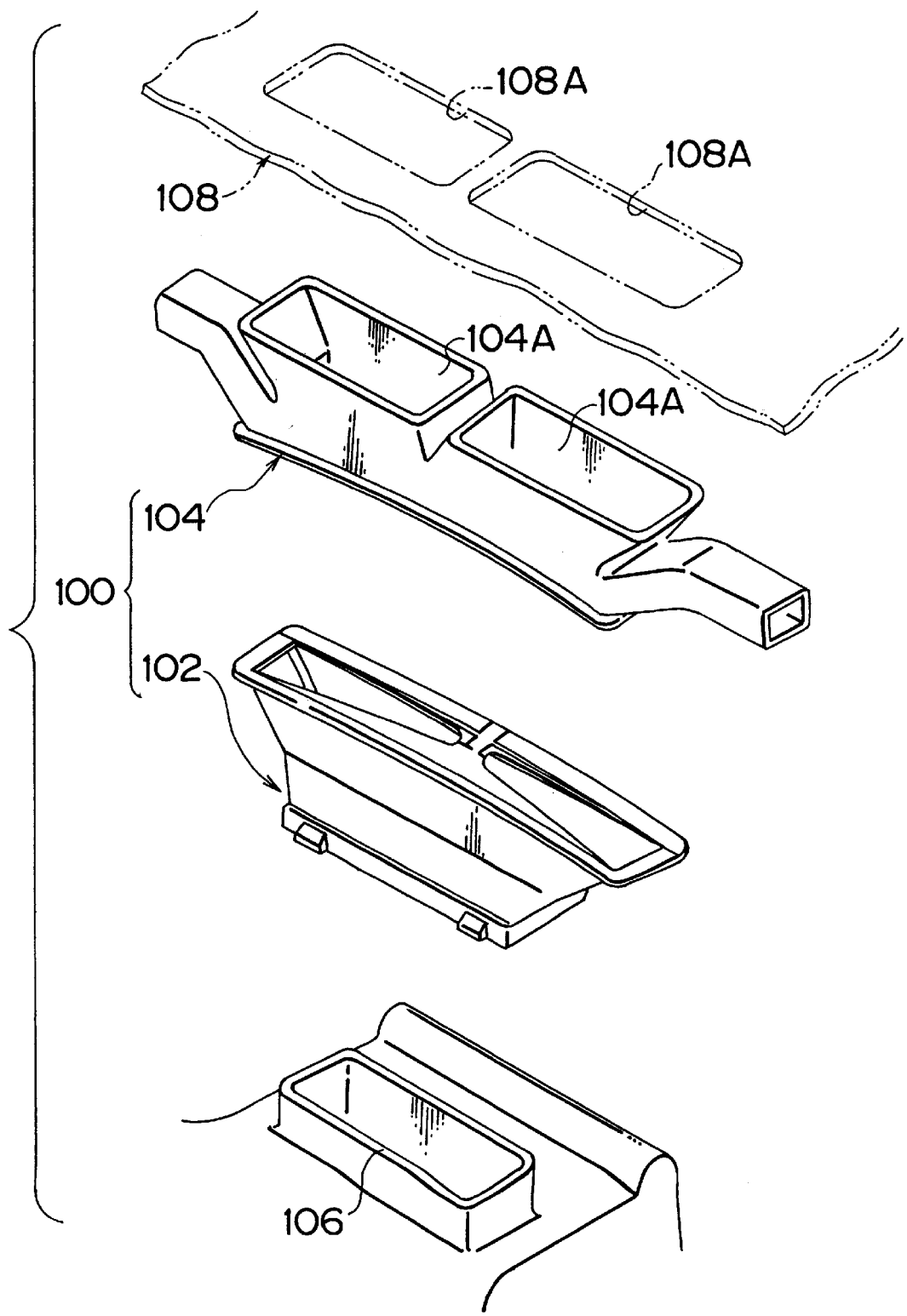
FIG. 4 is an exploded perspective view of a generally employed installation structure of defroster duct of an embodiment of the present invention seen in the inclined direction from the rear of the vehicle.

As shown in FIG. 3, a defroster duct 10 of this embodiment is fitted between a blow port 12 of an air conditioning unit mounted on a front lower portion of the vehicle compartment and a blow port 16 pierced through an instrument panel 14. The defroster duct 10 leads the flow of conditioned air (the air at the temperature controlled by the air conditioning unit so as to be blown to the interior of the vehicle) supplied through the blow port 12 of the air conditioning unit to the blow port 16. A lower connecting portion 17 is formed at the lower portion of the defroster duct 10 so as to be joined with the blow port 12 of the air conditioning unit.

The defroster duct 10 has a slotted blow port 18 opened to the inner surface of the windshield glass (substantially upward direction of the vehicle) and extending in the lateral direction across the vehicle width at the top of a duct portion 10A. A plurality of straightening vanes 20 (in this embodiment, 5 straightening vanes) are formed on the inner peripheral edge of the blow port 18 at a predetermined interval in the lateral direction. A flange 22 is formed around the outer peripheral edge of the blow port 18. A plurality of connecting portions 10B (in this embodiment, 3 connecting portions) are formed on the front side edge 22A of the flange 22 at a predetermined interval in the lateral direction. These connecting portions 10B extend forward from the front side edge 22A of the flange 22.

Figure 2:
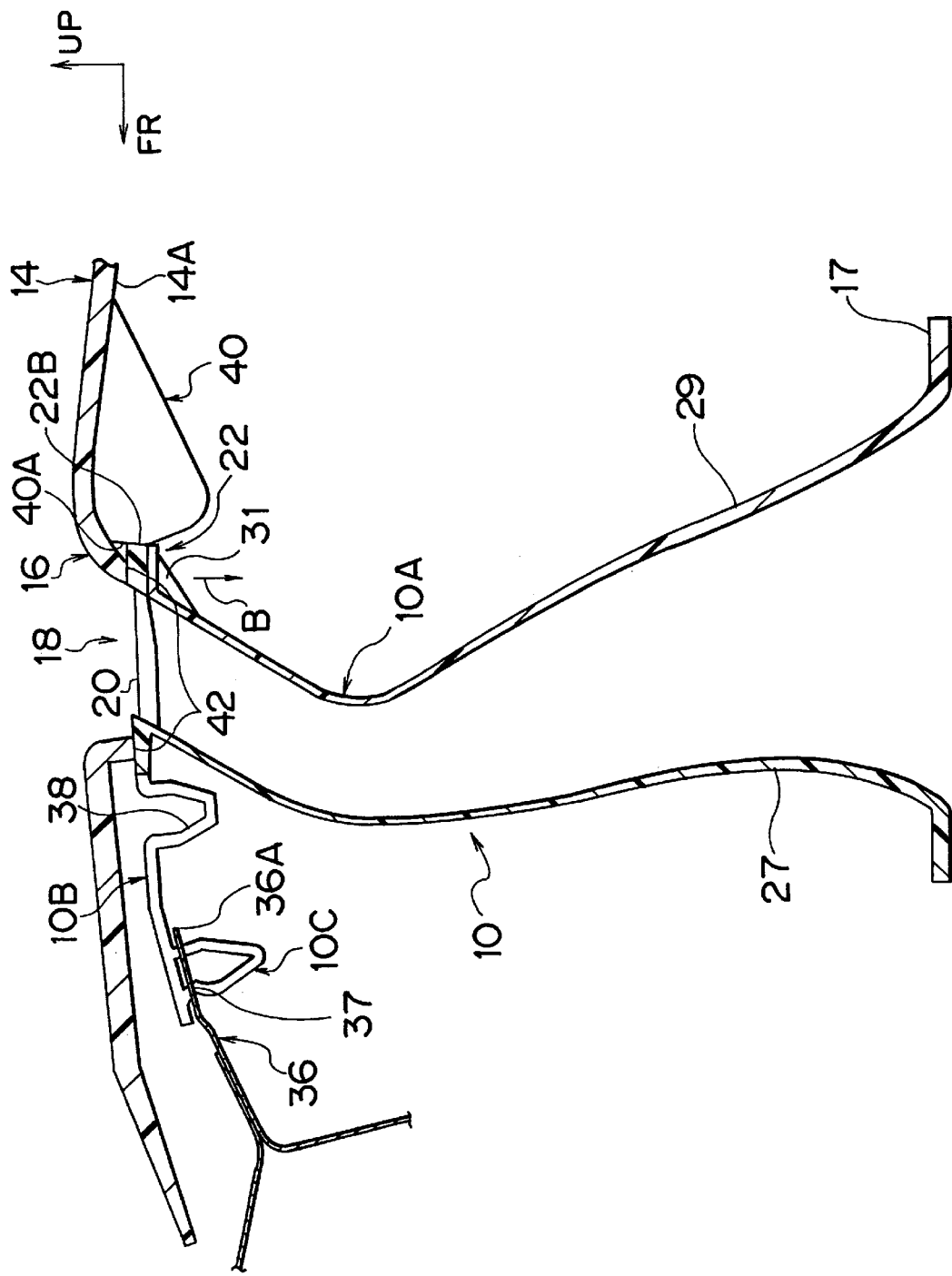
FIG. 2 is an enlarged sectional view taken along the line II—II of FIG. 3.

Referring to FIGS. 1 and 2, the defroster duct 10 is formed of a member 27 at the front side and a member 29 at the rear side, which are joined together at a joint portion 32 constituting each end of the defroster duct 10 in the lateral direction through adhesion, insert fitting, or the like. A plurality of ribs 31 (in this embodiment, 3 ribs at the positions opposite to the corresponding connecting portions 10B), each having a triangle profile, are formed at the lower portion of the flange 22. These ribs 31 serve to reinforce rigidity of the flange 22.

An engagement portion 10C to be engaged with the vehicle body is formed at the lower surface of the front end of the connecting portion 10B such that the engagement portion 10C protrudes therefrom. The engagement portion 10C is engaged with a fitting hole 37 pierced through a rear end flange 36A of a cowl panel 36 at the vehicle body side. The width of the top end of the engagement portion 10C, that is, the portion around the boundary between the lower surface of the front end of the connecting portion 10B and the engagement portion 10C in the longitudinal direction of the vehicle, is smaller than the width of the portion in the longitudinal direction at the intermediate position of the length of the connecting portion 10B. Therefore, once the engagement portion 10C is engaged with the fitting hole 37, it is difficult to remove it.

At an intermediate point of the connecting portion 10B of the defroster duct 10 in the longitudinal direction, a curve portion 38 is formed into the U-like shape, extending downwards. Therefore, if the force either in the longitudinal or vertical direction of the 130 vehicle acts upon the connecting portion 10B, the curve portion 38 will elastically deform.

At the back (lower) surface 14A of the instrument panel 14, a plurality of ribs 40 (in this embodiment, 3 ribs formed at the positions opposite to the corresponding ribs 31 of the defroster duct 10), each having a triangle profile, are formed as positioning portions at a predetermined interval in the lateral direction. A front end 40A of the rib 40 abuts against the rear side edge 22B of the flange 22 of the defroster duct 10. The rear side edge 22B is pressed forward of the vehicle (to the direction shown by arrow A in FIG. 1). In the case where the rib 40 presses the flange 22 of the defroster duct 10 forward of the vehicle, the curve portion 38 formed in the connecting portion 10B elastically deforms such that the width of the opening of the U-like shape is reduced. As a result, the blow port 18 of the defroster duct 10 can be kept in the position so as to be aligned with the blow port 16 of the instrument panel 14.

At the back (lower) surface 14A of the instrument panel 14, protrusions 42 each extending downward are formed as positioning portions along the periphery of the blow port 16. The protrusion 42 abuts against the upper surface of the flange 22 of the defroster duct 10, such that the flange 22 is pressed downward of the vehicle. If the protrusion 42 presses the flange 22 of the defroster duct 10 downward of the vehicle, the curve portion 38 of the connecting portion 10B elastically deforms. As a result, the abutment of the protrusion 42 against the upper surface of the flange 22 can be maintained.

The function of this embodiment will be described hereinafter.

In this embodiment, when installing the defroster duct of this embodiment to the vehicle body, the engagement portion 10C of the defroster duct 10 is engaged with the fitting hole 37 pierced through the rear end flange 36A of the cowl panel 36 at the vehicle body side. Thereafter, the front end portion 40A of the rib 40 formed on the lower surface of the instrument panel 14 is brought into abutment against the rear side edge 22B of the flange 22 of the defroster duct 10. As a result, the blow port 18 of the defroster duct 10 can be aligned with the blow port 16 of the instrument panel 14. In the present embodiment, the instrument panel 14 is installed in the inclined direction from the upper rear to the lower front of the vehicle relative to the duct portion of the defroster duct 10.

The front end portion 40A of the rib 40 formed on the lower surface of the instrument panel 14 is brought into abutment against the rear side edge 22B of the flange 22 of the defroster duct 10. Thereafter, if the instrument panel 14 is further shifted toward the fixed direction (the direction shown by arrows A and B in FIG. 1), the rib 40 formed on the lower surface of the instrument panel 14 presses the duct portion 10A of the defroster duct 10 to the fixed direction. In the above state, the engagement portion 10C of the defroster duct 10 is engaged with the fitting hole 37 formed in the rear end flange 36A of the cowl panel 36 at the vehicle body side. The curve portion 38 of the connecting portion 10B elastically deforms to displace the duct portion 10A relative to the engagement portion 10C. Accordingly, the blow port 18 of the defroster duct 10 is kept aligned with the blow port 16 of the instrument panel 14, thus eliminating relative displacement therebetween. Unlike the generally employed art, in the present invention, the defroster duct 10 does not have to be preliminarily integrated with the instrument panel 14. Accordingly, the size of the instrument panel 14 can be reduced, and the installation capability can be improved.

In this embodiment, when the rib 40 formed on the instrument panel 14 serves to press the duct portion 10A of the defroster duct 10 forward of the vehicle (direction shown by arrow A in FIG. 1), the curve portion 38 of the connecting portion 10B elastically deforms. Accordingly, the duct portion 10A of the defroster duct 10 shifts forward of the vehicle accompanied with the displacement of the instrument panel 14. In the above state, the instrument panel 14 is fixed to the vehicle body, and the reaction force acts upon the portion between the rib 40 and the side surface of the flange 22. As a result, the fit of the joint portion between the defroster duct 10 and the instrument panel 14 in the longitudinal direction can be made tighter.

In this embodiment, when the protrusion 42 formed on the instrument panel 14 serves to press the duct portion 10A of the defroster duct 10 downward of the vehicle (direction shown by arrow B in FIG. 1), the curve portion 38 of the connecting portion 10B elastically deforms. Then, the instrument panel 14 is shifted and accordingly, the duct portion 10A of the defroster duct 10 is shifted downward of the vehicle. In the above state, the instrument panel 14 is fixed to the vehicle body. Therefore, the reaction force caused by elastic deformation of the curve portion 38 acts upon the portion between the projection 42 and the upper surface of the flange 22. As a result, the fit of the joint portion between the defroster duct 10 and the instrument panel 14 in the vertical direction of the vehicle can be made tighter.

The present invention has been described in detail with respect to the specific embodiment. It is, however, understood for those skilled in the art that the present invention is not limited to the specific embodiment as described above and various embodiments can be made within the scope of the present inventive concepts. In the defroster duct installation structure of the embodiment described herein, the ribs 31 are formed at the lower side of the flange 22 of the defroster duct 10. However, those ribs 31 do not have to be provided. In the defroster duct installation structure described herein, 3 connecting portions 10B of the defroster duct 10 are used. However, the number of the connecting portions 10B is not limited to 3, but may be specified to 1, 2, or 4 or more number. The connecting portion 10B can be formed as other deforming portion instead of the curve portion 38, for example, bellows or the like. In this embodiment, the curve portion 38 is formed into U-like shape so as to be easily deformed. However, another portion that can be deformed easier than any other portion of the defroster duct may be formed instead of the curve portion 38 as the measure for displacing the relative position between the duct portion of the defroster duct and the engagement portion. Alternatively, a different material may be used to constitute the deforming portion.

In this embodiment, the connecting portion 10B is formed on the side surface of the flange 22 of the defroster duct at the front side of the defroster 10. However, the connecting portion 10B can be formed on the side surface of the flange 22 of the defroster duct 10 at the rear side of the vehicle or right and left sides of the vehicle. In the above case, the connecting portion 10B is preferably formed on the duct portion opposite to the portion where the instrument panel abuts against the duct portion of the defroster duct in accordance with the direction where the instrument panel 14 is installed to the vehicle body.

What is claimed is:

1. A defroster duct installation structure comprising:

a defroster duct including an engagement portion adapted to be engaged with a vehicle body and a duct portion that leads air to an interior of a vehicle;

an instrument panel covering said defroster duct;

a positioning portion formed in said instrument panel, abutting against a duct portion of said defroster duct so as to align a blow port of said defroster duct with a blow port of said instrument panel; and displacement means connected to said defroster duct for allowing displacement of said duct portion relative to said engagement portion.

2. A defroster duct installation structure according to claim 1, wherein said displacement means has a deforming portion formed in said defroster duct which deforms when said positioning portion presses the duct portion of said defroster duct.

3. A defroster duct installation structure according to claim 2, wherein said deforming portion elastically deforms when said positioning portion presses the duct portion of said defroster duct.

4. A defroster duct installation structure according to claim 1, wherein said displacement means is disposed between said engagement portion and said duct portion.

5. A defroster duct installation structure according to claim 1, wherein said displacement means is formed in the duct portion opposite to a portion where the duct portion of said defroster duct abuts against said positioning portion, and deformed in a direction substantially similar to a direction for installing said instrument panel.

6. A defroster duct installation structure according to claim 1, wherein said instrument panel is adapted to be installed to said duct portion from substantially rear of the vehicle, and said displacement means allows shifting of the duct portion relative to the engagement portion of said defroster duct in a longitudinal direction.

7. A defroster duct installation structure according to claim 1, wherein said instrument panel is adapted to be installed to said duct portion from substantially upward of the vehicle, and said displacement means allows shifting of the duct portion relative to the engagement portion of said defroster duct in a vertical direction of the vehicle.

8. A defroster duct installation structure according to claim 1, wherein said positioning portion is a rib formed on a lower surface of said instrument panel.

9. A defroster duct installation structure according to claim 8, wherein a profile of said rib is triangular.

10. A defroster duct installation structure according to claim 1, wherein said positioning portion is a protruded portion formed on a lower surface of said instrument panel.

11. A defroster duct installation structure according to claim 1, wherein said displacement means has an U-like shaped curve portion disposed between said engagement portion and said duct portion.

* * * * *